May 16, 1967  H. S. EIDY  3,319,757
BALE PICKUP
Filed March 1, 1965  2 Sheets-Sheet 1
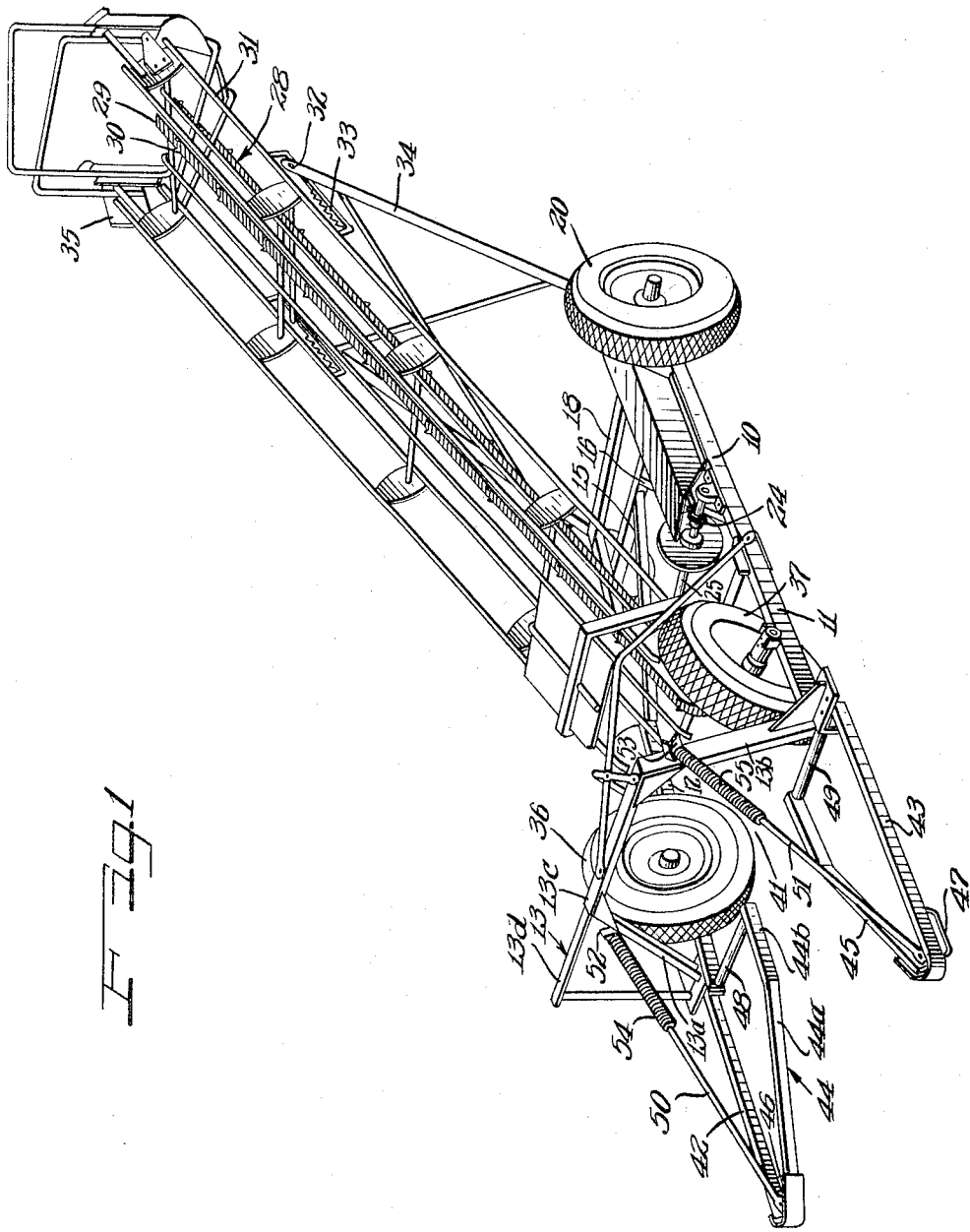
INVENTOR.
Hass S. Eidy
BY
ATTORNEYS

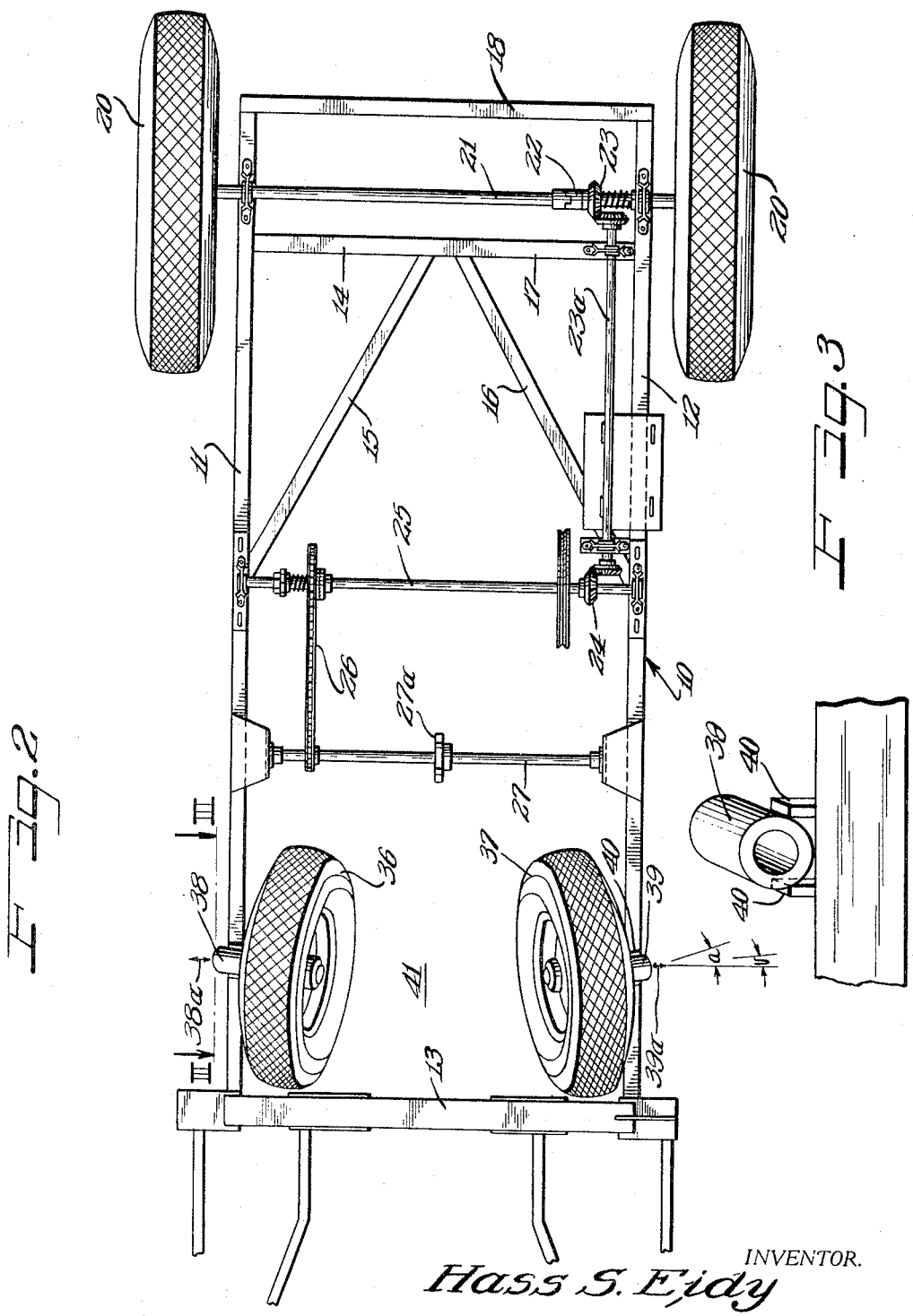

United States Patent Office 3,319,757
Patented May 16, 1967

3,319,757
BALE PICKUP
Hass S. Eidy, Sioux Falls, S. Dak., assignor to Du-Al Manufacturing Co., Sioux Falls, S. Dak., a corporation of South Dakota
Filed Mar. 1, 1965, Ser. No. 435,957
5 Claims. (Cl. 198—9)

The present invention relates to bale pickup and loading mechanisms.

More particularly the invention relates to a bale loader of the type which must pick up bales of hay or other similar material lying on the ground in random fashion and pick up and elevate the bales for loading them onto a traveling wagon or other similar vehicle. In loading hay bales, for example, the bales may be round or square and frequently lying in random fashion on the ground not completely aligned with the direction of travel of the loader. The loader is pulled by a tractor or other similar motivating mechanism which also pulls a wagon for collecting and hauling the bales and the loader must pick up the random bales and elevate them to an adequate height to be transferred over onto the wagon. The hay bales are formed of hay which may be cut in different stages of maturity so that as the hay dries the cut bales may have different compactness and frequently are quite loose. It is necessary to use a pickup mechanism which can handle loose as well as tight bales and can transfer them to a loader without tearing the bales apart and loosening them from the binding wire or twine. Other problems are encountered in loaders in that the bales have to be snatched up off of the ground and transferred to the elevating mechanism without tearing or skidding the bale and this must be accomplished on uneven terrain and with bales of varying sizes and compactness. Bale elevators frequently utilize elevating chains with projections spaced along the chain, and the pickup mechanism must be able to transfer the bale to the chain without the projection having sufficient movement relative to the bale so it snatches at it or tears it as it is being transferred.

It is accordingly an object of the present invention to provide an improved bale loading mecanism and particularly an improved pickup device for picking up bales off of the ground and transferring them to the lower end of an elevating mechanism.

A further object of the invention is to provide an improved pickup mechanism which is capable of handling bales of different sizes and handling either round or square bales and bales of different compactness without damage to the bales.

A still further object of the invention is to provide an improved bale pickup mechanism which avoids the necessity of providing belts or other devices which require tension adjustments or frequent attention or servicing and particularly which utilizes rotating wheels performing a dual function in picking up bales and also providing partial support for the mechanism and being so positioned and located relative to other elements of the structure so that bales are reliably picked up and handled without damage.

Other objects, advantages and features will become more apparent with the teaching of the principles of the invention in connection with the disclosure of the preferred embodiment thereof in the specification, claims and drawings, in which:

FIGURE 1 is a perspective view of a loader including a pickup and elevating mechanism in accordance with the principles of the present invention;

FIGURE 2 is a top plan view of the loader with the upper portions, including the elevating mechanism, removed for clarity; and FIGURE 3 is a fragmentary detailed sectional view taken substantially along line III—III of FIGURE 2.

On the drawings:

As shown in FIGURES 1 and 2, the loading mechanism is supported on a frame 10 which is arranged so that it can be connected to be drawn across a field beside a tractor or truck pulling a bale carrying vehicle such as a wagon along behind. The bales are picked up off the ground, elevated and transferred over onto the wagon while the vehicles are moving across the field The loader includes a frame 10 having side frame pieces 11 and 12 and connected cross frame pieces. At the front of the machine a yoke-shaped frame piece 13 includes angled vertical members 13a and 13b and an upper cross member 13c. Suitable side frame mechanism such as 13d is provided for connecting the loader to a tractor.

Across the back of the frame are cross frame members 14 and 18 and angled rigidifying frame members 15 and 16 extend from the side frame members 11 and 12 to connect to the cross frame member 14.

At the rear end of the frame are supporting main drive wheels 20 connected to a drive shaft 21 suitably supported in bearings on the frame. The drive shaft 21 is connected through a disconnectible clutch 22 to bevel gearing 23 to drive a power transfer shaft 23a which through bevel gears 24 drives a cross shaft 25. The cross shaft 25 through chain and sprockets 26 drives a conveyor chain shaft 27 fitted with a sprocket 27a which drives a conveyor chain 29, FIGURE 1. The conveyor or elevating chain 29 has spaced projections 30 which carry the bales upwardly on the elevator frame 31, with the overall conveyor being indicated by the numeral 28 in FIGURE 1.

As will be appreciated, other drive means may be employed for the elevator such as by power takeoff from the tractor or by engine mounted on the loader. However, in accordance with the principles of the present invention, a pickup arrangement is employed which does not require driving means but it is self-driven by contact with the ground.

When the bales are carried up the elevator mechanism 28 they are shunted laterally off to one side on a chute 35 which angles laterally over onto the wagon.

The height of the elevator can be changed to accommodate the height of the load as it builds up on the wagon by changing the angle of the elevator 28. To accomplish this, the elevator 28 is pivotally supported at its lower end on the shaft 27 and is supported in its pivotal operating position by vertical rods 34. These have a cross bar 32 at their upper end which seats in notches and an adjusting plate 33. As illustrated in FIGURE 1, the elevator is set at its lowest angle for traveling, but for elevating and loading operation the bar 32 will be set in one of the other notches dependent upon the height of the wagon and the height to which the load builds thereon.

A critical portion of the handling of the bale occurs when it is picked up off the ground and transferred to the elevator. On the ground the bale is stationary and it certainly must be lifted upwardly and started in motion on the conveyor chain. Further, the bales frequently are in random positions and not fully aligned longitudinally in the direction of movement of the loader.

For picking up the bales off the ground a pair of pickup wheels 36 and 37 are provided. These wheels are preferably rubber tired so as to provide inner facing surfaces of rubber which have frictional engagement with the bales. Bales of either round or square shape can be accommodated and are caught between the wheels and are simultaneously both lifted and carried rearwardly, and are accelerated rearwardly to a speed which is substantially the same as the speed of the conveyor chain 29 so that the hooks or projections 30 do not tear the bale. The wheels engage the bales in surface engagement so that as they pick it off the ground and accelerate it from being stationary to movement in the direction of the conveyor sliding relative movement between the inner surfaces of the wheels 36 and 37 and the bales is between a somewhat resilient rubber surface so that the bales are not damaged and the bales are held with a slight compression and are reliably held whether they are loosely packed or firmly packed. The pickup wheels 36 and 37 are rotatably supported in bearing housings 38 and 39 which are secured on the side frame pieces 11 and 12. As shown in FIGURE 3, the bearing housing may be supported for rigidity by welded lugs 40 on each side of the housing secured to the side frame members 11 and 12. The pickup wheels will handle cylindrical or square bales over a range of sizes so that the machine will generally be constructed with the wheels having a predetermined spacing in predetermined angles for the general type of bales which it will handle. In some instances it will be desirable to make the spacing between the wheels 36 and 37 adjustable and suitable adjustment mechanism can be provided as shown schematically by the doubled arrow lines 38a and 39a. This adjustment mechanism may also include mechanism for setting the angles of the wheels. For example, supporting studs in slotted slider openings which secure the studs in place may be employed which permit setting the angular adjustment and the axial spacing adjustment of the wheels. The wheels are preferably operated with their axes angled upwardly at a vertical angle $u$ and angled forwardly in an approach angle $a$. Excellent results have been found to be obtained with $a$ being substantially 6½° and $u$ being substantially 17°. The pickup wheels are positioned so as to be further apart at the front entry end of the bale receiving space than at the rear discharge end, and to be further apart at their top than at their bottom.

At the front of the loader is the aligning mechanism which receives bales lying in random positions and generally guides them to the bale-receiving space 41 between the wheels. The guide mechanism includes inwardly angled guide rails 44 and 45 which are substantially horizontal to the groun and which have a leading angled portion 44a and a subsequent portion 44b, which has a smaller angle. The rail 45 is constructed the same. The guide structures include outer bars 42 and 43 and are pivotally supported at their trailing ends on cross rods 48 and 49. At the leading end of the guides are ground contacting members 46 and 47 which are shown in the form of studs. These permit the rails 44 and 45 to remain horizontal to the ground over uneven terrain.

The guides are urged toward the ground by rods 50 and 51 connected at the front ends of the guides and carrying coil compression springs 54 and 55 surrounding the upper ends of the rods with the rods being slidable to spring support blocks 52 and 53. This permits the guides to move upwardly as they ride over a high spot of ground.

In operation, the loader will be pulled up forwardly and the bales will be aligned by passing between the horizontal rails 44 and 45 which turn or roll the bales inwardly and guide them into the bale-receiving space 41 between the pickup wheels 36 and 37. The pickup wheels snatch the bales up off the ground wedging them between the lower portions of the wheels lifting them onto the conveyor chain 29 and moving them rearwardly at the speed of operation of the chain. The pickup wheels also provide a front support for the rotor with the rear end supported by the wheels 20 which also drives the conveyor chain 29.

Thus it will be seen that I have provided an improved loader with features which meet the objectives and advantages above set forth. The loader is reliable and sure in operation and picks up bales of a greater variation in density and size and without damage to the bales as in constructions heretofore available.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A field operated bale pickup and loading mechanism comprising, an elevating means lifting bales upwardly to be loaded on a bale carrying vehicle, frame means supporting the elevating means for moving it forwardly over the ground, and a pickup mechanism including opposed ground engaging idler frame supported wheels rotating on axes extending generally laterally relative to the direction of travel of the mechanism over the ground and having a bale receiving space therebetween with the lower portion of the wheels positioned adjacent the ground, said bale receiving space between the wheels extending longitudinally relative to the direction of travel and leading to the elevating means so that bales on the ground will be frictionally caught between said wheels and carried to the elevating means, the axis of each of the wheels being canted upwardly in an inward direction so that the lower portions of the wheels are closer together than the upper portions.

2. A field operated bale pickup and loading mechanism comprising, an elevating means lifting bales upwardly to be loaded on a bale carrying vehicle, frame means supporting the elevating means for moving it forwardly over the ground, and a pickup mechanism including opposed ground engaging idler frame supported wheels rotating on axes extending generally laterally relative to the direction of travel of the mechanism over the ground and having a bale receiving space therebetween with the lower portion of the wheels positioned adjacent the ground, said bale receiving space between the wheels extending longitudinally relative to the direction of travel and leading to the elevating means so that bales on the ground will be frictionally caught between said wheels and carried to the elevating means, the axes of said wheels being canted in an inward direction upwardly and forwardly so that said bale receiving space is wider at the forward and upper portion of the wheels than at the lower and rearward portion thereof.

3. A field operated bale pickup and loading mechanism comprising, an elevating means lifting bales upwardly to be loaded on a bale carrying vehicle, frame means supporting the elevating means for moving it forwardly over the ground, and a pickup mechanism including opposed frame supported wheels rotating on axes extending generally laterally relative to the direction of travel of the mechanism over the ground and having a bale receiving space therebetween with the lower portion of the wheels positioned adjacent the ground, said bale receiving space between the wheels extending longitudinally relative to the direction of travel and leading to the elevating means so that bales on the ground will be frictionally caught between said wheels and carried to the elevating means, the axes of said wheels being canted in an inward direction upwardly and forwardly so that said bale receiving space is wider at the forward and upper portion of the wheels than at the lower and rearward portion thereof, the axes of said wheels being angled forwardly at an angle of substantially 6½° and being angled upwardly at an angle of substantially 17°.

4. A field operated bale pickup and loading mechanism comprising, an elevating means lifting bales upwardly to be loaded on a bale carrying vehicle, frame means supporting the elevating means for moving it forwardly over the ground, a pickup mechanism including opposed frame supported wheels rotating on axes extending generally laterally relative to the direction of travel of the mechanism over the ground and having a bale receiving space therebetween with the lower portion of the wheels positioned adjacent the ground, said bale receiving space between the wheels extending longitudinally relative to the direction of travel and leading to the elevating means so that bales on the ground will be frictionally caught between said wheels and carried to the elevating means, and bale guides on the frame means in front of the wheels having inwardly angled bale aligning rails pivotally supported on their rear ends on the frame means with ground engaging supporting means on the front ends and provided with springs acting between the frame and bale guides urging the rails downwardly at their leading ends to maintain them substantailly horizontal and maintain the supporting means in engagement with the ground over uneven terrain and to permit upward movement against the frame means.

5. A field operated bale pickup and loading mechanism for being connected to a power vehicle comprising, an elevating chain conveyor extending upwardly from a location adjacent the ground, a frame supporting the conveyor, supporting wheels under the frame, forward bale pickup wheels on the frame positioned immediately ahead of the elevating chain and spaced apart to have a bale receiving longitudinally extending space therebetween with their axes angled forwardly and upwardly so that the space between the wheels is less at the lower end trailing portion thereof than at the leading and upper portion, pivotally mounted bale guides supported on the frame in front of the pickup wheels pivoted at their rear ends and having inwardly inclined converging substantially horizontal bale aligning rails with ground engaging supporting shoes at the free front ends thereof, springs between the frame and the guides urging them against the ground over uneven terrain, power means driven by the first wheels operatively connected to the elevating chain, adjusting means between the frame and the elevating chain for adjusting the angle of inclination of the chain relative to the ground, and means for delivering bales carried upwardly by the elevating chain in a lateral direction relative thereto for depositing them on a bale carrying vehicle.

References Cited by the Examiner

UNITED STATES PATENTS

| | | | |
|---|---|---|---|
| 2,195,471 | 4/1940 | Sishc | 198—9 |
| 2,586,324 | 2/1952 | Graves | 198—7 |
| 2,597,220 | 5/1952 | Appel | 198—9 |
| 2,648,185 | 8/1953 | Dahlman | 171—58 X |
| 2,688,392 | 9/1954 | Dion | 198—9 |
| 3,102,625 | 9/1963 | Petermeier | 198—7 |
| 3,103,979 | 9/1963 | Hammer | 171—58 |
| 3,250,332 | 5/1966 | Wielaard | 171—58 |

FOREIGN PATENTS

| | | |
|---|---|---|
| 203,109 | 3/1956 | Australia. |
| 213,319 | 6/1960 | Austria. |

EVON C. BLUNK, *Primary Examiner.*

E. A. SROKA, *Assistant Examiner.*